United States Patent [19]
Gross et al.

[11] Patent Number: 5,650,229
[45] Date of Patent: Jul. 22, 1997

[54] SHAPED UNIDIRECTIONAL FIBER PREFORMS

[75] Inventors: Ronald David Gross, Storrs; Brett David Kushner, Wallingford, both of Conn.

[73] Assignee: Dow-United Technologies Composite Products Inc., Wallingford, Conn.

[21] Appl. No.: 698,289

[22] Filed: Aug. 15, 1996

Related U.S. Application Data

[63] Continuation of Ser. No. 354,584, Dec. 13, 1994, abandoned.

[51] Int. Cl.⁶ .................. D02G 3/00; B32B 3/00; B32B 5/12; B32B 1/00
[52] U.S. Cl. ............... 428/370; 428/375; 428/61; 428/113; 428/162; 428/174
[58] Field of Search .................. 428/302, 162, 428/174, 370, 375, 61, 113; 524/404; 156/171, 242, 309.8

[56] References Cited

U.S. PATENT DOCUMENTS

| | | |
|---|---|---|
| 4,113,910 | 9/1978 | Loyd . |
| 4,331,723 | 5/1982 | Hamm . |
| 4,559,005 | 12/1985 | Gants et al. . |
| 4,707,316 | 11/1987 | Fujioka et al. ............ 264/135 |
| 4,770,838 | 9/1988 | Cattanach et al. ............ 264/510 |
| 4,842,787 | 6/1989 | Chess, Jr. et al. ............ 264/406 |
| 4,988,469 | 1/1991 | Reavely et al. ............ 264/113 |
| 4,992,228 | 2/1991 | Heck et al. . |
| 4,997,615 | 3/1991 | Cattanach et al. ............ 264/510 |
| 5,037,599 | 8/1991 | Olson ............ 264/510 |
| 5,080,851 | 1/1992 | Flonc et al. ............ 264/258 |
| 5,098,496 | 3/1992 | Breitigam et al. ............ 156/180 |
| 5,120,380 | 6/1992 | Strachan ............ 156/164 |
| 5,156,795 | 10/1992 | Harvey et al. ............ 264/510 |
| 5,206,085 | 4/1993 | Nakagawa et al. ............ 428/373 |
| 5,207,850 | 5/1993 | Parekh ............ 156/166 |
| 5,232,970 | 8/1993 | Solc et al. ............ 524/404 |
| 5,277,566 | 1/1994 | Augustin et al. ............ 425/114 |
| 5,294,461 | 3/1994 | Ishida ............ 427/293 |
| 5,344,515 | 9/1994 | Chenock, Jr. ............ 156/171 |
| 5,397,608 | 3/1995 | Soens ............ 428/373 |

FOREIGN PATENT DOCUMENTS

| | | |
|---|---|---|
| 0 287 103 | 10/1988 | European Pat. Off. . |
| 2 246 320 | 1/1992 | United Kingdom . |
| WO 83/00118 | 1/1983 | WIPO . |

*Primary Examiner*—Newton Edwards
*Attorney, Agent, or Firm*—McAulay Fisher Nissen Goldberg & Kiel, LLP

[57] ABSTRACT

A fiber filler for filling voids between mated fiber plies, for example, as occurs in the preparation of a preform assembly for forming a T-shaped structural member, is disclosed. The fiber filler comprises a plurality of unidirectional fibers, shaped to conform to the shape of the void and a stabilizer intermingled with the unidirectional fibers. The stabilizer is present in an amount sufficient to hold the fibers together in the shape of the void, but below an amount which would inhibit resin flow during subsequent injection, so that the fiber filler is fully integrated into the final part.

4 Claims, 4 Drawing Sheets

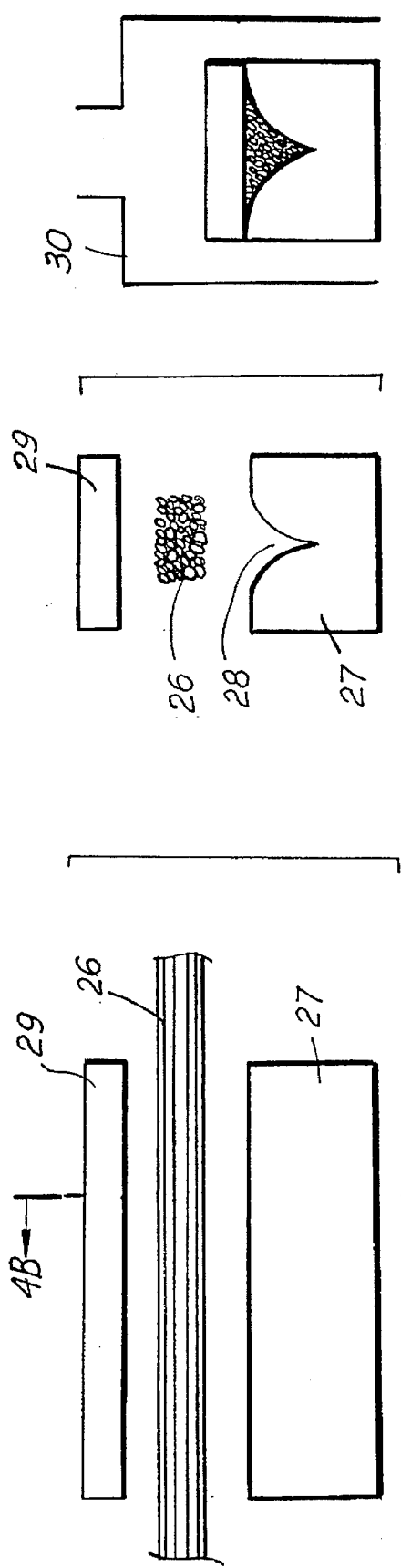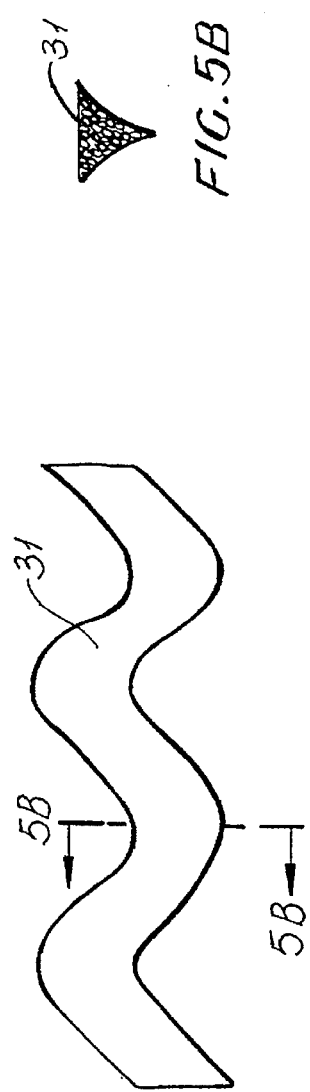

SHAPED UNIDIRECTIONAL FIBER PREFORMS

This is continuation of application Ser. No. 08/354,584, filed Dec. 13, 1994, now abandoned.

TECHNICAL FIELD

This invention relates to a net shaped fiber filler used for filling gaps between butted plies in a complex composite preform assembly and more particularly to a fiber filler for preforms used in a resin transfer molding process.

BACKGROUND

In the fabrication of composite articles, it is typical to assemble a plurality of orientated dry fiber layers and to shape them to match the shape of the article. The assembly, known as a "preform", is placed in a mold and resin is injected into the mold to infiltrate the fiber layers. The resin is cured to produce the article. This is known as a "resin transfer molding" (RTM) process.

When assembling the various fiber layers, or "plies", it is common to encounter various junctions made between a pair of plies which results in a void space or gap. For example, with reference to FIG. 1a, a structural member 1 known as a sinewave spar has an upper flange 2 supported by a sinusoidally shaped web 3. FIG. 1b shows a cross-section of such a structure which includes a plurality of first plies 4 and a plurality of second plies 5 which form the web 3 of the structure with a third plurality of plies 6 placed over a top surface of the first and second plies, to form the flange 2. When producing such a structure, a problem develops in that a gap 7 is formed where the plies meet.

If the preform having these assembled plies is placed into a mold, and resin injected into the mold, the various fiber layers may be forced to enter the gap, thus distorting the fiber orientation, as illustrated by the phantom lines. This produces a weakness in the structure. This fiber distortion does not completely fill the gap, and a resin rich area results which is a site for initiating cracks and delaminations. Such a part would be rejected, due to the potential for failure. Thus, it is important to maintain the fiber plies in the proper curved shape while at the same time reducing the resin rich region formed in the gap between the plies.

Various methods were considered for solving this problem. One utilized a cured insert made of chopped fibers or another similar discontinuous structural material which is shaped, cured and then located in the gap before the cap plies 6 are added. While such an insert provides support for the curved portion of the layers, it does not adequately bond with the adjacent plies since it fails to incorporate any resin during injection. This leaves a discontinuity in the interface between the insert and plies, and thus, a weakness in the structure remains. In addition, the discontinuous fiber is very fragile when pressed and cured into discrete lengths, making it difficult to handle during preform assembly.

Another method utilized a pre-impregnated unidirectional fiber ("prepreg") tape, that is folded and pressed into a shaped tool and debulked. The shaped material is then removed from the tool and placed into the preform gap. It was found that the pre-impregnation of the fibers failed to allow sufficient resin infiltration during injection for full integration with the part. Again, a discontinuity remained between the prepreg and the adjacent plies.

Another alternative utilized a dry fiber braided rope 8, as shown in FIG. 1c. However, the braid, having interlocked fibers, maintained its circular cross-section and failed to properly fill the gap. Thus, it continued to allow fiber distortion and resin rich regions.

To address these problems, a filler is needed for the gaps between plies that is capable of being handled by an assembler without fiber shifting. The time required to produce the assembled preform must also be minimized. The filler, once located in the preform assembly, must be near net shape to avoid distorting the adjacent plies and be inspectable for defects before resin injection so that any defects can be corrected before the final part is produced. Utilizing materials which must conform to the gap during tool closure do not provide adequate assurance that the part will be successfully produced. When inspection is only available after part construction, there is a significant potential for producing rejected parts, wasting labor, material and mold time.

SUMMARY OF THE INVENTION

It is an object of the present invention to provide a filler which is 100% inspectable prior to resin injection, accurately shaped to fill the gap completely, have a capability to be handled and placed in the gap simply and without fiber separation, be of the necessary fiber volume to substantially fill the gap and provide adequate support for the adjacent ply portions during injection, and allow resin infiltration during resin injection for full integration with the part.

These objects are achieved by a unidirectional shaped fiber filler comprising a plurality of unidirectional fibers, having a stabilizer integrated with the fibers, the fibers being shaped in a mold to the shape of a gap, the stabilizer present in an amount sufficient to hold the unidirectional fibers in the designated shape for incorporation into a preform assembly, but below an amount which would inhibit subsequent resin RTM infiltration.

By using a shaped stabilized unidirectional fiber filler, the desired fiber volume and shape are achieved for completely filling the gap. The filler is substantially rigid and easily handled, as the stabilizer prevents the unidirectional fibers from separating after formation. Since there are no crossing fibers, the unidirectional nature of the fibers makes shaping to complex shapes quite simple. This allows the entire gap, of whatever shape to be completely filled with the fibers. The amount of stabilizer necessary to hold these fibers together is less than 10% and preferably on the order of 3% to 5%, by weight, relative to the fiber weight, which enhances subsequent resin infiltration. In addition, the fiber volume can be predetermined and controlled, to be in the range of about 60% to 72%, and more preferably about 68%. Utilizing such a shaped unidirectional fiber filler allows full integration of the injection resin such that a homogenous structure is achieved.

BRIEF DESCRIPTION OF THE DRAWINGS

FIGS. 4a, b and c are illustrative views showing the shaping of the inventive fiber filler.

FIG. 5a is a top view of a shaped filler produced in accordance with the applicants' invention, FIG. 5b is a cross section taken along the line 5b—5b of FIG. 5a.

DETAILED DESCRIPTION OF THE INVENTION

Figure 2:
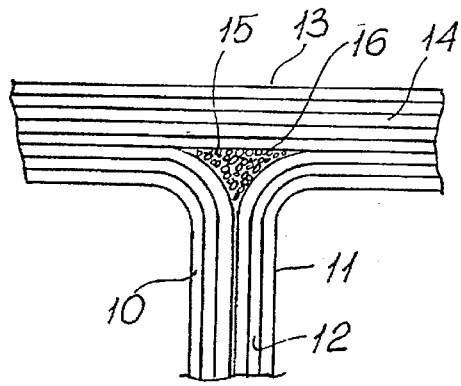
FIG. 2 is a cross sectional view of a structure incorporating the net shaped unidirectional fiber filler of the applicants' invention.

Referring to FIG. 2, a cross sectional view of a net shaped unidirectional fiber filler of the applicants' invention is illustrated. As previously described, an illustrative junction occurs in a T-shaped structural member which has a first plurality of plies 10 and a second plurality of plies 11 which form a web 12 and a third plurality of plies 13 which provides a cap over the web to form a flange 14. Inserted within a void or gap between these plies is a shaped unidirectional fiber filler 15. In essence, a plurality of unidirectional fibers 16 fill the area formed by the junction between the three plies such that each of the plies receives sufficient support to prevent significant fiber ply distortion during a subsequent resin injection step.

The filler 15 is produced in a molding process utilizing a stabilizer which is preferably a compatible resin to that which will ultimately be used in the part. The term "stabilizer" means a material which allows first shaping of the unidirectional fibers and then holding of the fibers in the desired shape. The stabilizer is thus present in an amount sufficient to hold the fibers together, but below an amount that would cause interference with subsequent resin infiltration during molding of the assembled plies.

The fibers are preferably provided in a sufficient density so as to provide a comparable fiber volume to that sought for the part and at least in an amount adequate to support the shaped portions of the plies to prevent distortion of the plies or damage during resin injection.

Figure 3:
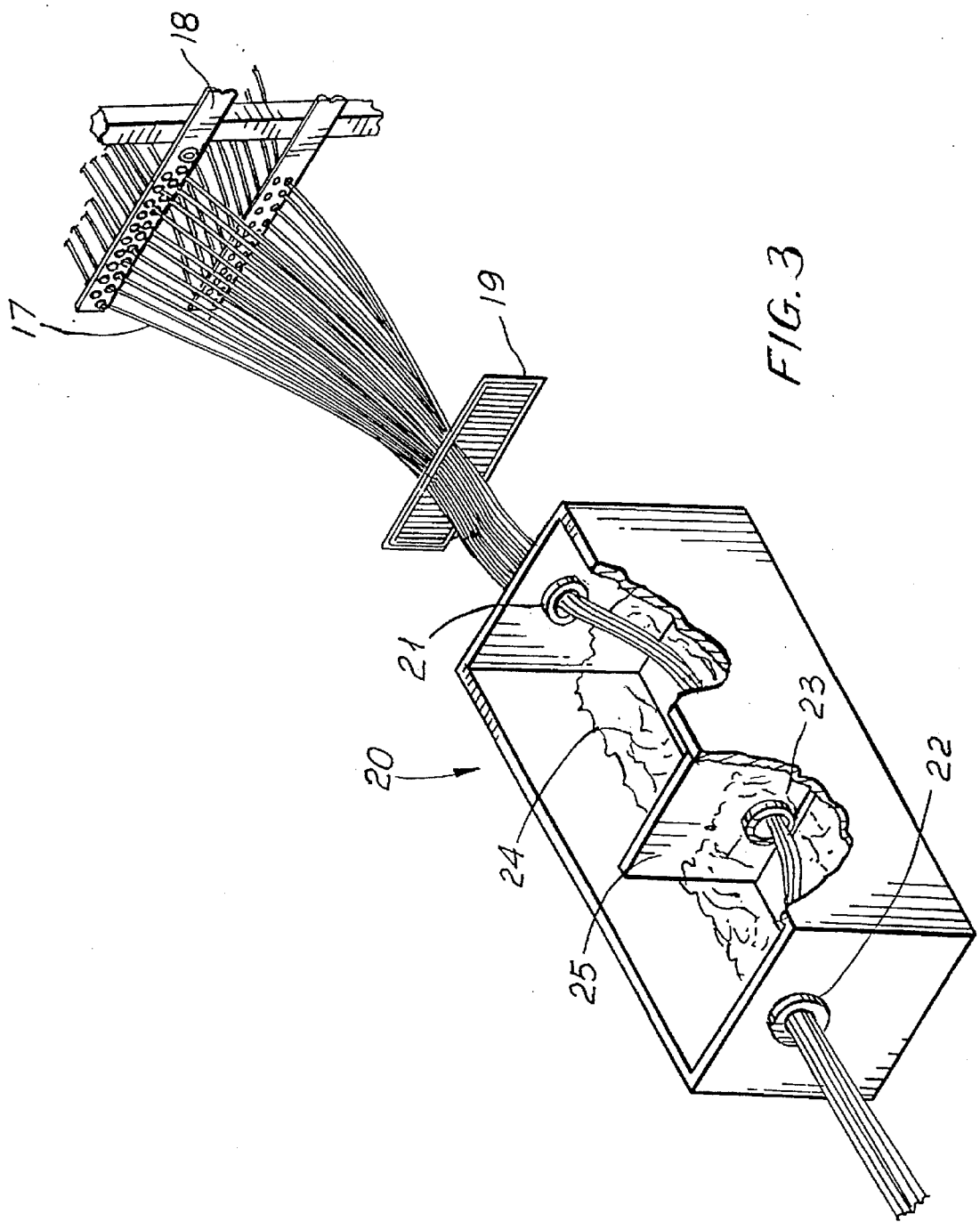
FIG. 3 is an illustrative view of the preliminary steps to forming the inventive net shaped unidirectional fiber filler.

Referring to FIG. 3, the method utilized for producing the shaped fiber filler is disclosed. A plurality of continuous fibers 17 are drawn through a creel 18 which supports a plurality of rolls of fiber (not shown). The fibers are then drawn through a reed 19 where the fibers are assembled into a bundle generally having a triangular cross section, similar to the expected void shape. Of course, virtually any shape can be attained and the triangular cross section is described for illustrative purposes only.

The fibers exit the reed and then pass through a bath container 20 which has an entrance bushing 21, an exit bushing 22, and an immersion bushing 23. The container has a solution 24 which contains a dissolved or suspended stabilizer for treating the fibers as they pass through the container. The immersion bushing is located in a baffle 25 beneath the surface of the solution, so that substantially all of the fibers are wetted with the stabilizer solution as they pass through the bath. Thus, the fiber bundle is continuously drawn through the entrance bushing, submerged in the stabilizer solution, exiting from the container through the bushing 22.

Preferably, the stabilizer is dissolved or suspended in an appropriate liquid to treat the fibers. The liquid may be organic, for example acetone, or water. In addition, the liquid used should be one which is removable without resulting in preliminary curing of the stabilizing resin. For example, where acetone is used, the molded filler can be heated to about 200°±10° F. for about 25±5 mins. to drive off the solvent, and then cooled to less than 120° F. before removal from the mold. However, the choice of times/temperatures depends on the stabilizer and higher or lower temperatures could be utilized with other stabilizer/liquid systems.

A 5% to 7% wt. solution in acetone or water is preferably prepared which results in a retention of about 3 to 5% stabilizer in the unidirectional fibers. From about 1 to 10% by weight stabilizer can be retained with no detrimental effects. More than 10% may result in inhibition of subsequent resin filtration and less than 1% raises the possibility that separation of the unidirectional fibers would occur. Preferably from about 3 to 7% and more preferably about 5% stabilizer is incorporated into the filler.

Referring to FIG. 4a, a treated fiber bundle 26 still wet from the bath is located above a mold 27 which has a cavity 28 shaped to the shape of the gap to be filled. The fiber bundle is aligned with the cavity and a capping device 29 used to press the fibers into the cavity. Since the fibers are unidirectional, they easily conform to the shape of the cavity. Once the capping device is placed on the mold, the ends of the fibers are trimmed and the mold is placed in an oven 30 and heated to a temperature sufficient to assure that the solvent is driven off leaving the unidirectional fibers in a stabilized condition in the shape of the mold cavity. Vacuum may be utilized to assist in solvent removal.

Figure 1B:
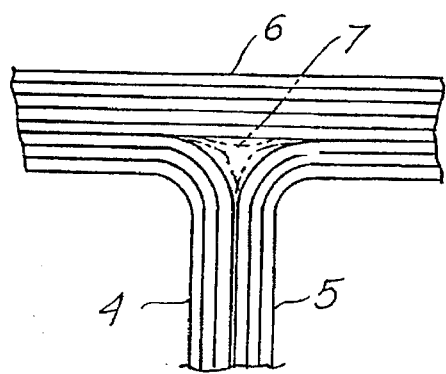
FIG. 1b shows a cross sectional view of a prior art junction.
Figure 1C:
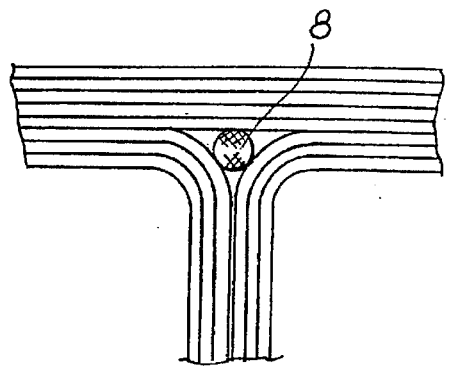
FIG. 1c is a view of a prior art ply junction utilizing a braided rope as the filler.
Figure 1A:
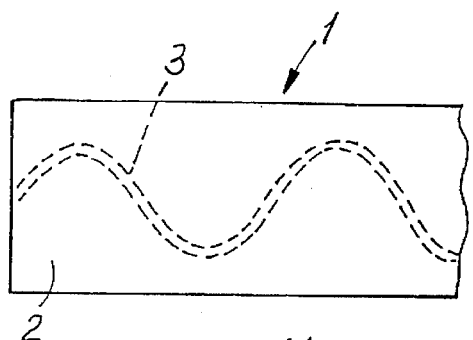
FIG. 1a is a top view of a sinusoidal spar.

After the solvent has been driven off, the filler is cooled, allowing the stabilizer to adhere the fibers in the shaped condition. The filler can then be removed from the mold and handled easily without the potential for unidirectional fiber separation or distortion. FIGS. 5a and b show a sinusoidal shaped unidirectional fiber filler 31 usable for producing a sinewave spar having a cross section as described in FIGS. 1a and 1b.

The filler can be inspected, stored and held until such time as it is needed. In preparing an assembled preform, an operator simply places the filler in the gap in the assembled preform, visually inspects that the gap is entirely filled, then adds the flange plies. The inspection prior to injection and molding assures that an acceptable part will be produced, and assures part to part consistency.

Various stabilizers can be used for holding the unidirectional fibers together. For example, the materials described in U.S. Pat. Nos. 5,271,766, 5,080,851, 5,071,711 or 4,992,228 can be used to stabilize these fibers. In addition, a stabilizer which may also be known as a tackifier, may be used which preferably contains either: (1) a single resin that is capable of at least partially curing with itself; or (2) a mixture containing resin and hardener that is capable of at least partially curing.

Examples of suitable resins which can cure with themselves include: epoxy resins, polyimide and particularly bismaleimide resins, polycyanate ester resins, vinyl ester resins (with suitable initiators and promoters) and benzocyclobutene resins. The most preferred example is 1,1'-MDA bismaleimide resin. Examples of suitable polyimide and bismaleimide resins are described in Stenzenberger, "Recent Advances in Thermosetting Polyimides", 20 *British Polymer Journal* 383–393 (1988). Examples of suitable commercially available resins that can cure with themselves include 5250-4RTH BMI resin, manufactured by Cytec Chemical Co.

While any available tackifier or stabilizer would work, it is preferable to use a compatible stabilizer which will allow curing after the subsequent resin injection.

Figure 6:
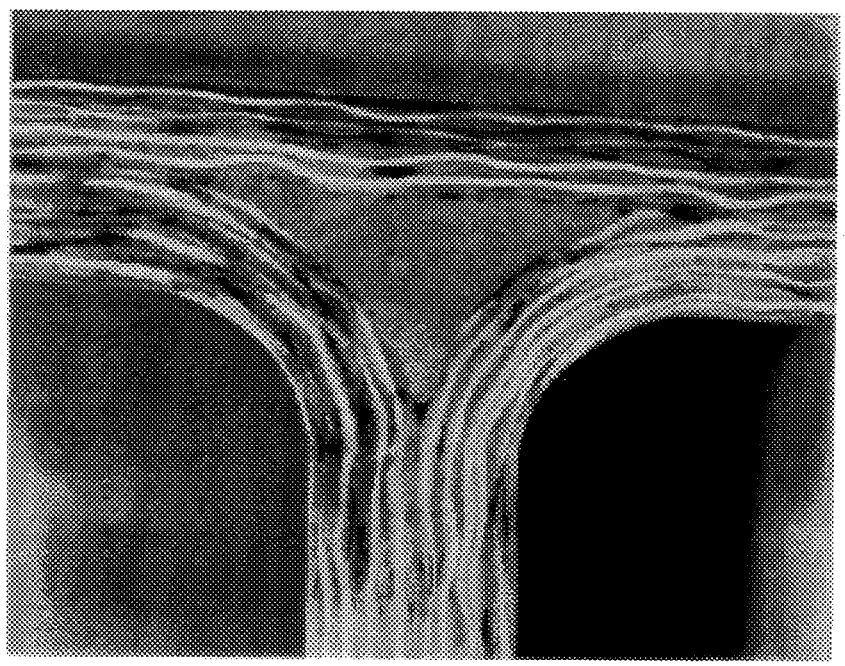
FIG. 6 is a photomicrograph of a cross-section of a beam incorporating the filler of the invention.

Referring to FIG. 6, a photomicrograph of a cross section of a beam utilizing the preform of the invention is shown. Essentially all of the curved fiber plies have maintained the proper alignment as have the straight fiber plies forming the flange. In addition, the unidirectional fiber filler has been completely assimilated into the part, to provide optimum strength.

The difference in strength between a structure utilizing a filler of the invention and one which allows the gap to fill with resin is significant. There is a 20% loss of strength when the beam is formed without the filler. In addition, cracking occurs in the area of resin richness which can initiate separation of the flange from the joint area.

Any fiber material, such as glass, graphite, silicon carbide or aramid may be used, as well as any fiber type or size, for producing the unidirectional fiber filler and any stabilizer can be used so long as it is compatible with the ultimate resin system. However, the fibers must be unidirectional fibers, as a cross fiber arrangement would constrict the ability of the unidirectional fibers to assume the shape necessary for filling the gap. Generally the fiber volume should be sufficient to maintain the adjacent plies in their shaped orientation and generally be in the range of about 55 to 70%, more preferably 65% to 71%.

The fibers must have a low resin content to be integrated into the part. If preimpregnated plies of unidirectional fibers are used, having a resin content of about 35%, the resulting composite part has a discontinuity at the interface between the prepreg and the preform due to their different curing requirements and/or dissimilar chemistry between the injected resin and the prepreg resin. Infiltration of the injection resin is necessary for avoidance of the discontinuity.

Among the stabilizers which may be used are a solid bismaleimide resin manufactured by Dow Chemical Company, known as XLJ-19019.00L, a solid fluorine type resin manufactured by 3-M Company known as AMD0036 or another liquid bismaleimide resin manufactured by Cytec Chemical Company known as 5250-4RTM. Any of these stabilizers among others, could be used. There is no criticality in the choice of stabilizer, other than it should have sufficient adhesive to hold the unidirectional fibers in place at the low resin content, and be compatible with the later injected resin.

While preferred embodiments of the present invention have been shown and described, it will be understood by those skilled in the art that various changes and modification could be made without varying from the scope of the present invention. For example, while a sinusoidal structure has been described for illustrative purposes, the shaped unidirectional fiber filler can be utilized in any composite part composed of an assembly of dry fiber plies which requires a filler for voids between adjacent plies and the invention is not limited to triangular shapes. Cubes, rectangles, ellipsoids, and virtually any other shape can be accommodated by the present invention. Any preform for resin transfer molding which has voids, continuous or discontinuous, which must be filled can utilize the invention.

We claim:

1. A plurality of treated fibers for filling a void between dry fiber plies in a preform assembly prior to injection of a resin into the preform assembly, the plurality of treated fibers consisting essentially of a plurality of fibers having a unidirectional fiber orientation, and a stabilizer retained between the plurality of fibers in an amount sufficient to allow resin infiltration, said stabilizer amount being from about 1 to 10% by weight, the plurality of unidirectional fibers having a stabilized shape to conform to the shape of the void, the stabilizer being selected from the group consisting of bismaleimide, polycyanate ester and epoxy resins.

2. The plurality of treated fibers of claim 1 wherein the plurality of unidirectional fibers are of sufficient number to provide a fiber volume of from about 55 to 70%.

3. The pluralitys of treated fiber of claim 1 wherein the stabilizer is present in an amount of from about 3 to 7% by weight.

4. The pluralitys of treated fiber of claim 1 wherein the fiber is selected from the group consisting of glass, graphite, silicon carbide, aramid, and combinations thereof.

* * * * *